US009104326B2

(12) United States Patent
Frank et al.

(10) Patent No.: US 9,104,326 B2
(45) Date of Patent: Aug. 11, 2015

(54) SCALABLE BLOCK DATA STORAGE USING CONTENT ADDRESSING

(75) Inventors: Shahar Frank, Ramat-HaSharon (IL);
Erez Webman, Petach-Tikva (IL);
Renen Hallak, Beit-YeHoshua (IL);
Kobi Luz, Rechovot (IL); Irit Yadin-Lempel, Caesarea (IL); Yaron Segev, RaAnana (IL)

(73) Assignee: EMC Corporation, Hopkinton, MA (US)

( * ) Notice: Subject to any disclaimer, the term of this patent is extended or adjusted under 35 U.S.C. 154(b) by 211 days.

(21) Appl. No.: 12/945,915

(22) Filed: Nov. 15, 2010

(65) Prior Publication Data

US 2012/0124282 A1    May 17, 2012

(51) Int. Cl.
*G06F 12/00* (2006.01)
*G06F 3/06* (2006.01)

(52) U.S. Cl.
CPC ............... *G06F 3/064* (2013.01); *G06F 3/061* (2013.01); *G06F 3/067* (2013.01); *G06F 3/0641* (2013.01); *G06F 3/0688* (2013.01)

(58) Field of Classification Search
CPC ...... G11C 15/00; G06F 3/067; G06F 11/1456
USPC ......................................... 711/108, 161, 162
See application file for complete search history.

(56) References Cited

U.S. PATENT DOCUMENTS

| | | | |
|---|---|---|---|
| 5,860,137 A * | 1/1999 | Raz et al. | 711/202 |
| 6,643,654 B1 * | 11/2003 | Patel et al. | 1/1 |
| 7,908,436 B1 * | 3/2011 | Srinivasan et al. | 711/114 |
| 8,200,923 B1 | 6/2012 | Healey et al. | |
| 8,478,951 B1 | 7/2013 | Healey et al. | |
| 2005/0125626 A1 * | 6/2005 | Todd | 711/202 |
| 2005/0144416 A1 * | 6/2005 | Lin | 711/201 |
| 2005/0193084 A1 * | 9/2005 | Todd et al. | 709/214 |
| 2006/0031653 A1 * | 2/2006 | Todd et al. | 711/170 |
| 2009/0222596 A1 | 9/2009 | Flynn et al. | |
| 2010/0042790 A1 * | 2/2010 | Mondal et al. | 711/161 |
| 2010/0180145 A1 * | 7/2010 | Chu | 714/2 |

FOREIGN PATENT DOCUMENTS

| | | |
|---|---|---|
| EP | 1804157 | 7/2007 |
| WO | WO 2010/019596 | 2/2010 |
| WO | WO 2010/040078 | 4/2010 |
| WO | WO 2012/066528 | 5/2012 |

OTHER PUBLICATIONS

International Search Report and the Written Opinion Dated Dec. 1, 2011 From the International Searching Authority Re. Application No. PCT/IL2011/000692.

(Continued)

*Primary Examiner* — Gurtej Bansal
(74) *Attorney, Agent, or Firm* — Krishnendu Gupta; Konrad R. Lee

(57) ABSTRACT

A device for scalable block data storage and retrieval uses content addressing. Data storage devices store data blocks, and are connected over a network to computing modules. The modules comprise control modules and data modules and carry out content addressing for both storage and retrieval. The network defines separate control paths via the control modules and data paths via the data modules.

22 Claims, 11 Drawing Sheets

(56) References Cited

OTHER PUBLICATIONS

Advance E-Mail Notification Concerning Transmittal of International Preliminary Report on Patentability (Chapter I of PCT) dated May 30, 2013 from the International Searching Authority re: International Application No. PCT/IL2011/000692.

U.S. Appl. No. 13/901,062 filed May 23, 2013, entitled "Method and Apparatus for Block Level Data De-Duplication."

* cited by examiner

SCALABLE BLOCK DATA STORAGE USING CONTENT ADDRESSING

FIELD AND BACKGROUND OF THE INVENTION

The present invention relates to a device and method for scalable block data storage using content addressing, and, more particularly, but not exclusively to such a device and method optimized for RAM data storage devices.

Storage systems in general, and block based storage systems specifically, are a key element in modern data centers and computing infrastructure. These systems are designed to store and retrieve large amounts of data, by providing data block address and data block content—for storing a block of data—and by providing a data block address for retrieval of the data block content that is stored at the specified address.

Storage solutions are typically partitioned into categories based on a use case and application within a computing infrastructure, and a key distinction exists between primary storage solutions and archiving storage solutions. Primary storage is typically used as the main storage pool for computing applications during application run-time. As such, the performance of primary storage systems is very often a key challenge and a major potential bottleneck in overall application performance, since storage and retrieval of data consumes time and delays the completion of application processing. Storage systems designed for archiving applications are much less sensitive to performance constraints, as they are not part of the run-time application processing.

In general computer systems grow over their lifetime and the data under management tends to grow over the system lifetime. Growth can be exponential, and in both primary and archiving storage systems, exponential capacity growth typical in modern computing environment presents a major challenge as it results in increased cost, space, and power consumption of the storage systems required to support ever increasing amounts of information.

Existing storage solutions, and especially primary storage solutions, rely on address-based mapping of data, as well as address-based functionality of the storage system's internal algorithms. This is only natural since the computing applications always rely on address-based mapping and identification of data they store and retrieve. However, a completely different scheme in which data, internally within the storage system, is mapped and managed based on its content instead of its address has many substantial advantages. For example, it improves storage capacity efficiency since any duplicate block data will only occupy actual capacity of a single instance of that block. As another example, it improves performance since duplicate block writes do not need to be executed internally in the storage system. Existing storage systems, either primary storage systems or archiving storage systems are incapable of supporting the combination of content based storage—with its numerous advantages—and ultra-high performance. This is a result of the fact that the implementation of content based storage scheme faces several challenges:

(a) intensive computational load which is not easily distributable or breakable into smaller tasks, (b) an inherent need to break large blocks into smaller block sizes in order to achieve content addressing at fine granularity. This block fragmentation dramatically degrades the performance of existing storage solutions, (c) inability to maintain sequential location of data blocks within the storage systems, since mapping is not address based any more, and such inability causes dramatic performance degradation with traditional spinning disk systems, (d) the algorithmic and architectural difficulty in distributing the tasks associated with content based mapping over a large number of processing and storage elements while maintaining single content-addressing space over the full capacity range of the storage system.

A number of issues arise with respect to such devices, and it is necessary to consider such issues as performance, lifetime, resilience to failure of individual devices, overall speed of response and the like.

Such devices may be used in highly demanding circumstances where failure to process data correctly can be extremely serious, or where large scales are involved, and where the system has to be able to cope with sudden surges in demand.

One challenge is to avoid performance bottlenecks and allow performance scalability that is independent of user data access patterns.

A second challenge is to support inline, highly granular block level deduplication without degrading storage (read/write speed) performance. The result should be scalable in both capacity—which is deduplicated over the full capacity space—and performance.

A further challenge is to address flash-based SSD write/erase cycle limitations, in which the devices have a lifetime dependent on the number of write/erase cycles.

SUMMARY OF THE INVENTION

An aim of the present embodiments is to address the above described challenges and to aim for a solution which combines finely-granular, highly efficient content-based storage that is internally based on content-based addressing and data management, while doing so in a way that can distribute all the processing and all storage functions over an arbitrary number of compute/store elements. Successful distribution of the processes may contribute to an essentially unlimited scalability in the performance and capacity of the system while maintaining a single content-addressing space throughout the full capacity of the system.

According to one aspect of the present invention there is a device for scalable block data storage and retrieval using content addressing, comprising data storage devices operative to store the blocks, connected over a network to computing modules, the modules comprising control modules and data modules, the modules being configured to carry out content addressing for the storage and retrieval, the network defining separately control paths via the control modules and data paths via the data modules.

In an embodiment, data routed over the control paths is routed based on an associated logical address, and data routed over the data paths is routed based on content.

In an embodiment, the control modules are operative to control execution of read and write commands and the data modules are respectively connected to at least one of the storage devices and are operative, under control of a respective control module, to pass data to or from the at least one respectively connected storage devices and to retain extracts of data stored in the at least one respectively connected storage device, the extracts being for the content addressing.

An embodiment may comprise hash modules, the hash modules being operative to calculate hash values for data which is the subject of storage or retrieval commands, the hash value being usable to provide the extracts for the content addressing.

In an embodiment, the hash modules are configured to use a hash function having an output range which is mapped evenly over the storage devices.

An embodiment may comprise routing modules, the routing modules being operative to terminate storage and retrieval operations and to distribute command parts of the operations to ones of the control modules selected to retain balanced usage within the device.

In an embodiment, the routing modules comprise hash calculation units operative to calculate hash values for data of the operations.

In an embodiment, the routing modules are operative to incorporate the hash values into digests which are associated with pages of the data.

In an embodiment, the routing modules are operative to use hash values of data associated with the operations to select one of the data modules for the distribution.

In an embodiment, the storage devices are random access storage devices.

In an embodiment, the data modules are operative to compare hash values of write data with hash values of already stored data, and where a match is found, to point to the matched data and avoid rewriting.

In an embodiment, the modules are combined into nodes on the network, and the nodes are connected over the network by a switch.

In an embodiment, the data storage is carried out with a granularity of 4 KB.

In an embodiment, the control modules are operative to use the content addressing to ensure that identical data appearing a second time is supplied with a pointer and not written, thereby avoiding duplicate write operations.

According to a second aspect of the present invention there is provided a method for scalable block data storage and retrieval using content addressing, comprising connecting data storage devices, to store the blocks, over a network to computing modules, the modules comprising control modules and data modules, the modules being carrying out content addressing for the storage and retrieval, and defining separately control paths via the control modules and data paths via the data modules.

In an embodiment, the control modules control execution of read and write commands and the data modules are respectively connected to at least one of the storage devices and, under control of a respective control module, pass data to or from the at least one respectively connected storage devices and retain extracts of data stored in the at least one respectively connected storage device, the extracts being for the content addressing.

An embodiment may comprise connecting hash modules to the network, and at the hash modules calculating hash values for data which is the subject of storage or retrieval commands, the hash value providing the extracts for the content addressing.

An embodiment may comprise connecting routing modules to the network, and at the routing modules terminating storage and retrieval operations and distributing command parts of the operations to ones of the control modules selected to retain balanced usage within the device.

An embodiment may comprise calculating, at the routing module, hash values for data being the subject of the operations.

In an embodiment, the routing modules use hash values of data associated with the operations to select one of the data modules for the distribution.

The storage devices may be random access storage devices.

In an embodiment, the routing modules compare hash values of write data with hash values of already stored data, and where a match is found, point to the matched data and avoid rewriting.

An embodiment may comprise combining the modules into nodes on the network, and connecting the nodes over the network by a switch. The network may be one that supports remote direct memory access (RDMA).

According to a third aspect of the present invention there is provided a method of expandable content addressable data storage comprising:

hashing incoming data to provide content addressable memory using a hashing function having an output space;

initially providing a plurality of modules including control modules and data storage modules for physical management of the data, the physical data management comprising mapping the hash function output space evenly over the data storage modules;

maintaining the hashed incoming data as a single content addressable storage pool for virtual management of the data; thereby to provide a structure for content addressable memory which is physically expandable without affecting the virtual management of the data.

According to a fourth aspect of the present invention there is provided an expandable content addressable data storage system comprising:

hashing modules configured for hashing incoming data to provide content addressable memory using a hashing function having an output space;

control modules and data storage modules for physical management of the data, the physical data management comprising mapping the hash function output space evenly over the data storage modules;

the hashing, control and switching modules being configured together to manage the hashed incoming data virtually as a single content addressable storage pool; thereby to provide a structure for content addressable memory which is physically expandable without affecting the virtual management of the data.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer or set of computers using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or flash based SSD and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
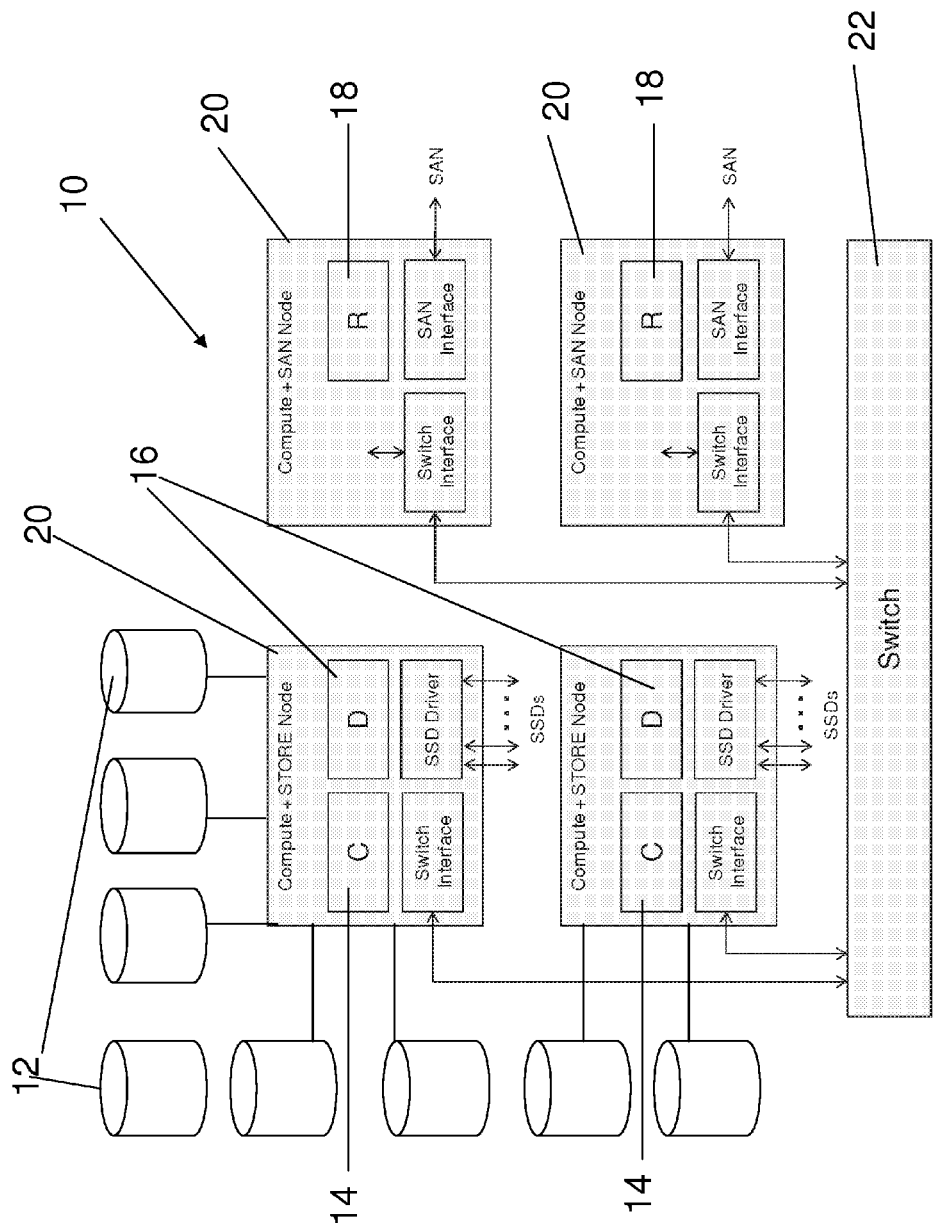
FIG. 1 is a simplified diagram schematically illustrating a first device for data storage, having separate control and data planes according to the present embodiments.

The present embodiments comprise a networked memory device comprising multiple memory storage units arranged for content addressable storage of data. The data is transferred to and from the storage units using separate data and control planes. Hashing is used for the content addressing, and the hashing produces evenly distributed results over the allowed input range. The hashing defines the physical addresses so that data storage makes even use of the device resources.

A relatively small granularity may be used, for example with a page size of 4 KB, although smaller or larger block sizes may be selected at the discretion of the skilled person. This enables the device to detach the incoming user access pattern from the internal access pattern. That is to say the incoming user access pattern may be larger than the 4 KB or other system-determined page size and may thus be converted to a plurality of write operations within the system, each one separately hashed and separately stored.

Content addressable data storage can be used to ensure that data appearing twice is stored at the same location. Hence unnecessary duplicate write operations can be identified and avoided. Such a feature may be included in the present device as data deduplication. As well as making the device more efficient overall, it also increases the lifetime of those storage units that are limited by the number of write/erase operations.

The separation of Control and Data may enable a substantially unlimited level of scalability, since control operations can be split over any number of processing elements, and data operations can be split over any number of data storage elements. This allows scalability in both capacity and performance, and may thus permit an operation to be effectively balanced between the different modules and nodes.

The separation may also help to speed the operation of the system. That is to say it may speed up Writes and Reads. Such may be due to:

(a) Parallel operation of certain Control and Data actions over multiple Nodes/Modules (b) Use of optimal internal communication/networking technologies per the type of operation (Control or Data), designed to minimize the latency (delay) and maximize the throughput of each type of operation.

Also, separation of control and data paths may allow each Control or Data information unit to travel within the system between Nodes or Modules in the optimal way, meaning only to where it is needed and if/when it is needed. The set of optimal where and when coordinates is not the same for control and data units, and hence the separation of paths ensures the optimization of such data and control movements, in a way which is not otherwise possible. The separation is thus key to keeping the workloads and internal communications at the minimum necessary, and may translate into increased optimization of performance.

De-duplication of data, meaning ensuring that the same data is not stored twice in different places, is an inherent effect of using Content-Based mapping of data to D-Modules and within D-Modules.

Scalability is inherent to the architecture. Nothing in the architecture limits the number of the different R, C, D, and H modules which will be discussed below. Hence any number of such modules can be assembled. The more modules we add, the higher the performance of the system becomes and the larger the capacity it can handle. Hence scalability of performance and capacity is achieved.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1 which illustrates a device 10 for scalable block data storage and retrieval using content addressing. The device comprises data storage devices 12 on which the data blocks are stored. The storage devices are networked to computing modules, there being several kinds of modules, including control modules 14 and data modules 16. The modules carry out content addressing for storage and retrieval, and the network defines separate paths or planes, control paths or a control plane which goes via the control modules 14 and data paths or a data plane which goes via the data modules 16.

The control modules 14 may control execution of read and write commands. The data modules 16 are connected to the storage devices and, under control of a respective control module, pass data to or from the storage devices. Both the C and D modules may retain extracts of the data stored in the storage device, and the extracts may be used for the content addressing. Typically the extracts may be computed by cryptographic hashing of the data, as will be discussed in greater detail below, and hash modules (FIG. 2) may specifically be provided for this purpose. That is to say the hash modules calculate hash values for data which is the subject of storage commands, and the hash values calculated may later be used for retrieval.

Routing modules 18 may terminate storage and retrieval operations and distribute command parts of any operations to control modules that are explicitly selected for the operation in such a way as to retain balanced usage within the device.

The routing modules may use hash values, calculated from data associated with the operations, to select the control module for the distribution. More particularly, selection of the control module may use hash values, but typically relies on the user address and not on the content (hash). The hash value is, however, typically used for selecting the Data (D) module, and for setting the physical location for data storage within a D module.

The storage devices may be solid state random access storage devices, as opposed to spinning disk devices, however disk devices may be used instead or in addition.

A deduplication feature may be provided. The routing modules and/or data modules may compare the extracts or hash values of write data with hash values of already stored data, and where a match is found, simply point to the matched data and avoid rewriting.

The modules are combined into nodes 20 on the network, and the nodes are connected over the network by a switch 22.

The use of content addressing with multiple data modules selected on the basis of the content hashing, and a finely-grained mapping of user addresses to Control Modules allow for a scalable distributed architecture.

A glossary is now given of terms used in the following description.

X-Page—A predetermined-size aligned chunk as the base unit for memory and disk operations. Throughout the present description we refer to 4 KB as the X-Page size, however other smaller or larger values can be used as well and nothing in the design is limited to a specific value.

LUN or Logical Unit Number, is a common name in the industry for designating a volume of data, or a group of data blocks being named with the LUN. Each data block is referred to, by the external user of the storage system, according to its LUN, and its address within this LUN Logical X-Page Address—Logical address of an X-Page. The address contains a LUN identifier as well as the offset of the X-Page within the LUN.

Logical Block—512 bytes (sector) aligned chunk, which is the SCSI base unit for disk operations.

Logical Block Address—Logical address of a Logical Block. The logical block address contains a LUN identifier as well as the offset of the logical block within the LUN.

Sub-LUN—Division of a LUN to smaller logical areas, to balance the load between C modules. Each such small logical area is called a sub-LUN.

Sub-LUN Unit Size—The fixed size of a sub-LUN.
X-Page Data—Specific sequence of user data values that resides in an X-Page. Each such X-Page Data is uniquely represented in the system by its hash digest.

D Primary—The D module responsible for storing an X-Page's Data

D Backup—The D module responsible for storing a backup for an X-Page Data. The backup is stored in a non-volatile way (NVRAM or UPS protected).

Acronyms
LXA—Logical X-Page Address.
LB—Logical Block.
LBA—Logical Block Address.
AUS—Atomic Unit Size.
SL—Sub-LUN.
SLUS—Sub-LUN Unit Size.
MBE—Management Back End.

The present embodiments relate to a block-level storage system, offering basic and advanced storage functionality. The design may be based on a distributed architecture, where computational, Storage Area Networking (SAN), and storage elements are distributed over multiple physical Nodes, with all such Nodes being inter-connected over an internal network through a switch device. The distributed architecture enables the scaling of the system's capabilities in multiple aspects, including overall storage capacity, performance characteristics in bandwidth and I/O operations per second (IOPS), computational resources, internal and external networking bandwidth, and other. While being based on a distributed architecture, the system presents, externally, a unified storage system entity with scalable capabilities.

The system's architecture and internal algorithms implementing the basic and advanced storage functions are optimized for improved utilization of the capabilities of random-access memory/storage media, as opposed to contrast with mechanical-magnetic spinning disk storage media. The optimizations are implemented in the design itself, and may, for example, include the ability to break incoming writes into smaller blocks and distribute the operation over different Nodes. Such an adaptation is particularly suitable for random access memory/storage media but is less suitable in a spinning-disk environment, as it would degrade performance to extremely low levels. The adaptation includes the content/hash based mapping of data distributes the data over different D Nodes in general and within D Nodes over different SSD devices. Again, such a scheme is more suitable for random access memory/storage media than for a spinning-disk media because such spread of data blocks would result in very poor performance in the spinning disk case. That is to say, the described elements of the present architecture are designed to work well with random access media, and achieve benefits in performance, scalability, and functionality such as inline deduplication. Such random-access memory media can be based on any or a combination of flash memory, DRAM, phase change memory, or other memory technology, whether persistent or non-persistent, and is typically characterized by random seek/access times and random read/write speeds substantially higher than those exhibited by spinning disk media. The system's internal data block mapping, the algorithms implementing advanced storage functions, and the algorithms for protecting data stored in the system are designed to provide storage performance and advanced storage functionality at substantially higher performance, speed, and flexibility than those available with alternative storage systems.

Data mapping within the system is designed not only to improve performance, but also to improve the life span and reliability of the electronic memory media, in cases where the memory technology used has limitations on write/erase cycles, as is the case with flash memory. Lifetime maximization may be achieved by avoiding unnecessary write operations as will be explained in greater detail below. For the purpose of further performance optimization, life span maximization, and cost optimization, the system may employ more than a single type of memory technology, including a mix of more than one Flash technology (e.g., single level cell—SLC flash and multi level cell—MLC flash), and a mix of Flash and DRAM technologies. The data mapping optimizes performance and life span by taking advantage of the different access speeds and different write/erase cycle limitations of the various memory technologies.

The core method for mapping blocks of data internally within the system is based on Content Addressing, and is implemented through a distributed Content Addressable Storage (CAS) algorithm.

This scheme maps blocks of data internally according to their content, resulting in mapping of identical block to the same unique internal location. The distributed CAS algorithm allows for scaling of the CAS domain as overall system capacity grows, effectively utilizing and balancing the available computational and storage elements in order to improve overall system performance at any scale and with any number of computational and storage elements.

The system supports advanced In-line block level deduplication, which may improve performance and save capacity.

System Functionality

Elements of the system's functionality are:
Write (store) data block at a specified user address;
Trim data block at a specified user address;
Read data block from a specified user address;
In-line block level deduplication.
The following features may be provided:
A distributed CAS based storage optimized for electronic random-access storage media; The optimization comprises utilizing storage algorithms, mainly the content-based uniformly-distributed mapping of data, that inherently spread data in a random way across all storage devices. Such randomization of storage locations within the system while maintaining a very high level of performance is preferably achievable with storage media with a high random access speed.
A distributed storage architecture with separate control and data planes;
Data mapping that maximizes write-endurance of storage media;
System scalability;
System resiliency to fault and/or failure of any of its components; and
Use of multi-technology media to maximize write-endurance of storage media;
In-line deduplication in ultra high performance storage using electronic random-access storage media.
The present embodiments implement block storage in a distributed and scalable architecture, efficiently aggregating performance from a large number of ultra-fast storage media elements (SSDs or other), preferably with no performance bottlenecks, while providing in-line, highly granular block-level deduplication with no or little performance degradation.

One challenge is to avoid performance bottlenecks and allow performance scalability that is independent of user data access patterns.

The present embodiments may overcome the scalability challenge by providing data flow (Write, Read) that is distributed among an arbitrary and scalable number of physical and logical nodes. The distribution is implemented by (a) separating the control and data paths (the "C" and "D" modules), (b) maintaining optimal load balancing between all Data modules, based on the content of the blocks (through the CAS/hashing mechanisms), hence ensuring always balanced load sharing regardless of user access patterns, (c) maintaining optimal load balancing between all Control modules, based on the user address of the blocks at fine granularity, hence ensuring always balanced load sharing regardless of user access patterns, and (d) performing all internal data path operations using small granularity block size, hence detaching the incoming user access pattern from the internal access pattern, since the user pattern is generally larger than the block size.

A second challenge is to support inline, highly granular block level deduplication without degrading storage (read/write speed) performance. The result should be scalable in both capacity—which is deduplicated over the full capacity space—and performance.

The solution involves distributing computation-intensive tasks, such as calculating cryptographic hash values, among an arbitrary number of nodes. In addition, CAS metadata and its access may be distributed among an arbitrary number of nodes. Furthermore, data flow algorithms may partition read/write operations in an optimally-balanced way, over an arbitrary and scalable number of Nodes, while guaranteeing consistency and inline deduplication effect over the complete storage space.

In detaching the data from the incoming pattern, the R-Module breaks up any incoming block which is larger than the granularity size across sub-LUNs, sending the relevant parts to the appropriate C-Modules. Each C-module is predefined to handle a range or set of Sub-LUN logical addresses. The C-Module breaks up the block it receives for distribution to D-Modules, at a pre-determined granularity, which is the granularity for which a Hash is now calculated. Hence the end result is that a request to write a certain block (for example of size 64 KB) ends up being broken up into for example 16 internal writes, each write comprising a 4 KB block.

The specific numbers for granularity can be set based on various design tradeoffs, and the specific number used herein of 4 KB is merely an example.

The broken down blocks are then distributed to the D modules in accordance with the corresponding hash values.

A further challenge is to address flash-based SSD write/erase cycle limitations, in which the devices have a lifetime dependent on the number of write/erase cycles.

The solution may involve Inline deduplication to avoid writing in all cases of duplicate data blocks. Secondly, content (hash) based mapping to different data modules and SSDs results in optimal wear-leveling, ensuring equal spread of write operations to all data modules and SSDs independently of the user data/address access patterns.

Functional Modules

Figure 2:
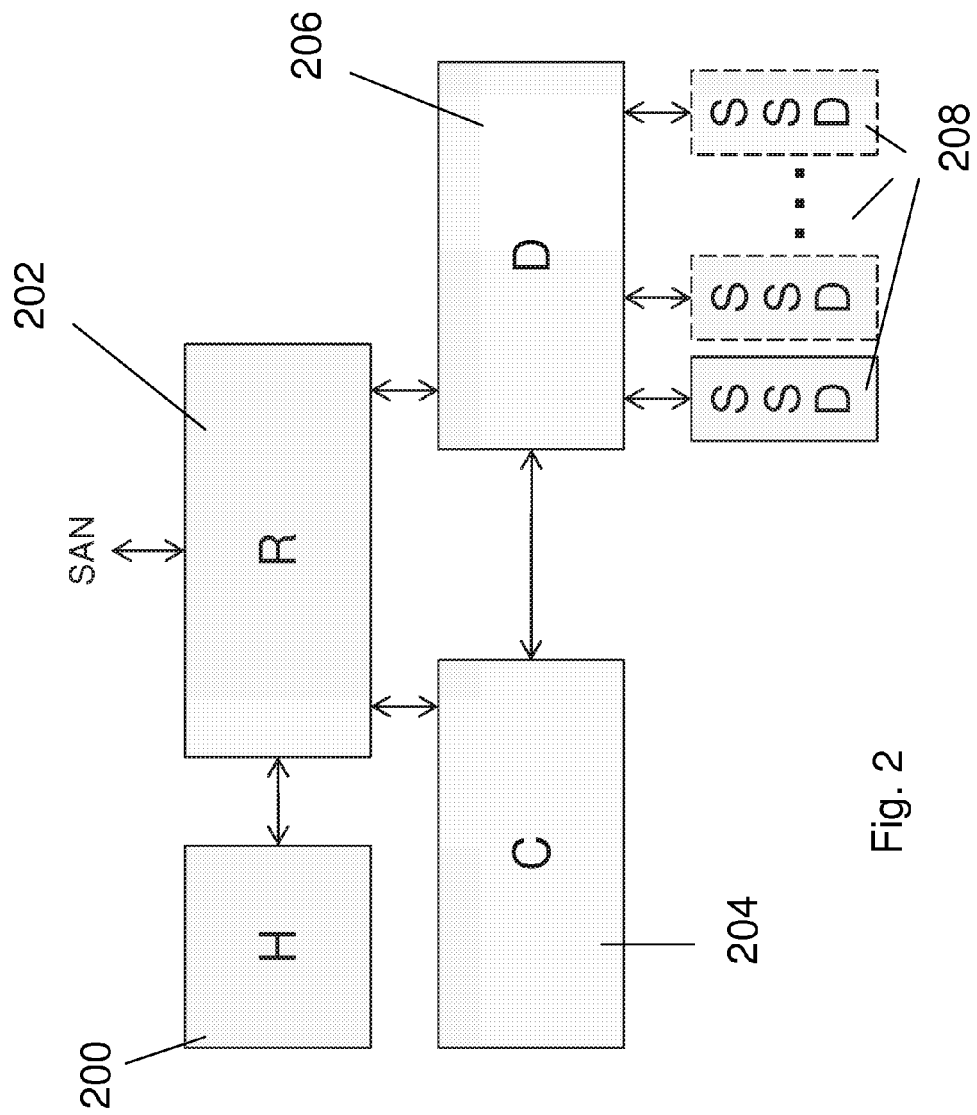
FIG. 2 shows an exemplary configuration of modules for the device of FIG. 1.

In the following the system is considered from a functional point of view. As discussed above in respect of FIG. 1, the system is architected around four main functional Modules designated R (for Router), C (for Control), D (for Data), and H (for Hash). Being modular and scalable, any specific system configuration must include at least one of R, C, D, and H, but may include a multiplicity of any or all of these Modules. Reference is now made to FIG. 2, which is a functional block diagram of the system in which an H module 200 is connected to an R module 202. The R module is connected to both Control 204 and data 206 modules. The data module is connected to any number of memory devices SSD 208.

A function of the R Module 202 is to terminate SAN Read/Write commands and route them to appropriate C and D Modules for execution by these Modules. By doing so, the R Module can distribute workload over multiple C and D Modules, and at the same time create complete separation of the Control and Data planes, that is to say provide separate control and data paths.

A function of the C Module 204 is to control the execution of a Read/Write command, as well as other storage functions implemented by the system. It may maintain and manage key metadata elements.

A function of the D Module 206 is to perform the actual Read/Write operation by accessing the storage devices 208 (designated SSDs) attached to it. The D module 206 may maintain metadata related with the physical location of data blocks.

A function of the H Module is to calculate the Hash function value for a given block of data.

Figure 3:
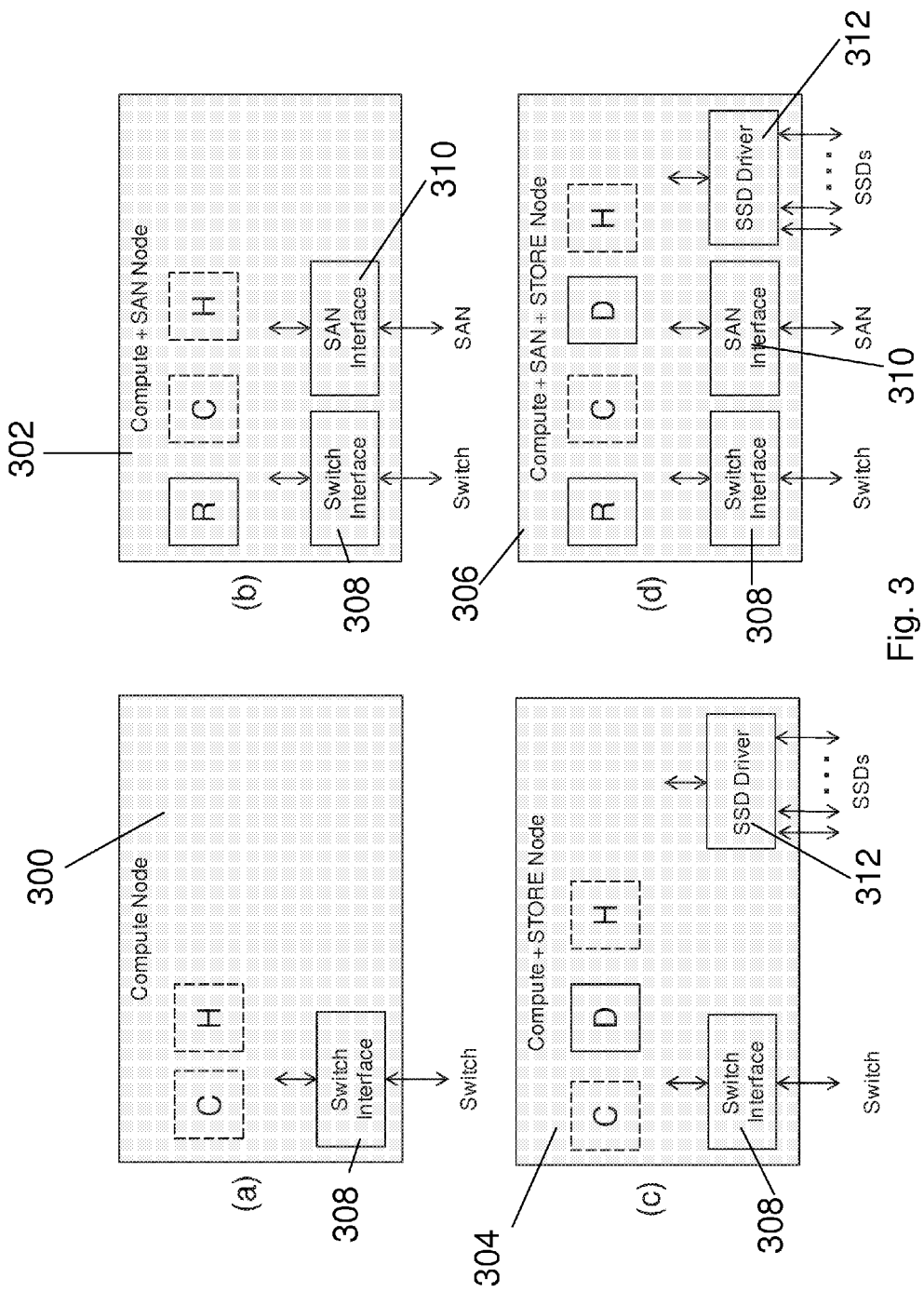
FIG. 3 is a simplified diagram schematically illustrating four different node configurations for a device according to the present embodiments.

Reference is now made to FIG. 3, which illustrates nodes. The R, C, D, and H Modules may be implemented in software, and executed on a physical Node. A system must include at least one physical Node, and may include multiple Nodes. There are four possible Node configurations: Compute Node 300, which includes control and hash modules, Compute+SAN Node 302 which includes a router as well as control and hash modules, Compute+Store Node 306, which includes a data module in addition to compute and hash modules, and a Compute+SAN+Store Node 306, which includes all four modules. A system must include a storage area networking or SAN function within at least one Node, and a Store function within at least one Node. The SAN function and the store function can be supported by the same physical Node or any combination of multiple Nodes.

In FIG. 3 each node type shows the functional Modules that must execute, in at least one copy, within the Node, and functional Modules that may optionally execute within this Node. Optional Modules are shown in dashed line.

All Nodes must include a switch interface 308, to allow interconnecting with a switch in a multi-Node system configuration. A Node that contains a SAN function must include at least one SAN Interface module 310 and at least one R Module. A Node that contains a Store function must include at least one SSD Driver Module 312 and at least one D Module. Hence, Compute+SAN and Compute+SAN+ STORE Nodes contain a SAN Interface, to interface with the external SAN. The interface may typically use a SCSI-based protocol running on any of a number of interfaces including Fiber Channel, Ethernet, and others, through which Read/ Write and other storage function commands are being sent to the system. Compute+Store and Compute+SAN+Store Nodes contain an SSD driver 312 to interface with SSDs 208 attached to that specific Node, where data is stored and accessed.

System Block Diagram

Figure 4:
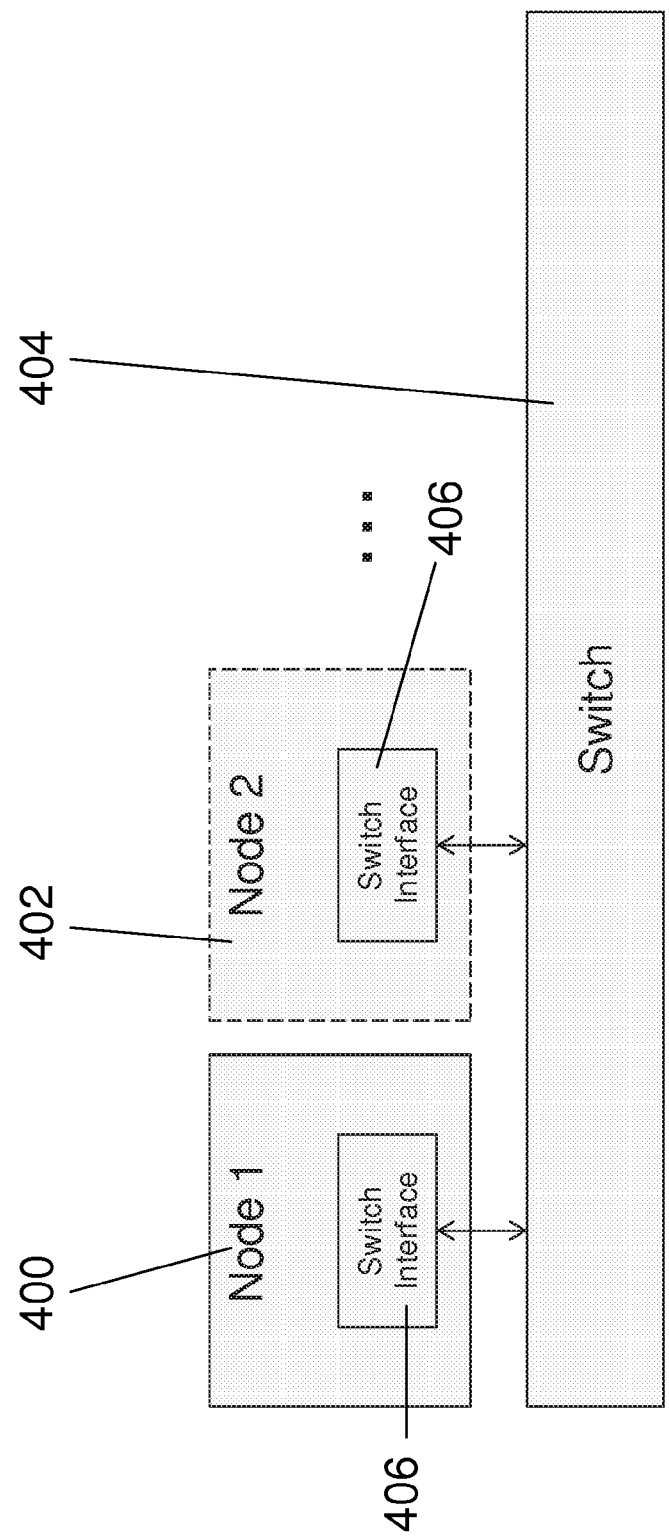
FIG. 4 is a simplified schematic diagram showing the nodes of FIG. 3 connected to a switch in accordance with the present embodiments.

Reference is now made to FIG. 4, which shows a high level system block diagram. A system implementation includes one or more Nodes 400, 402. In all cases where a system contains more than two Nodes, all physical Nodes are interconnected by a switch 404 which may be based on any of a number of networking technologies including Ethernet, Infiniband, or other. In the specific case of a 2-Node system, the two Nodes can be interconnected directly without a need for a switch.

High Level System Block Diagram

The interconnections between each Node and the Switch may include redundancy, so as to achieve high system availability with no single point of failure. In such a case, each Node may contain two or more Switch Interface modules 406, and the Switch may contains two or more ports per physical Node.

Figure 5:
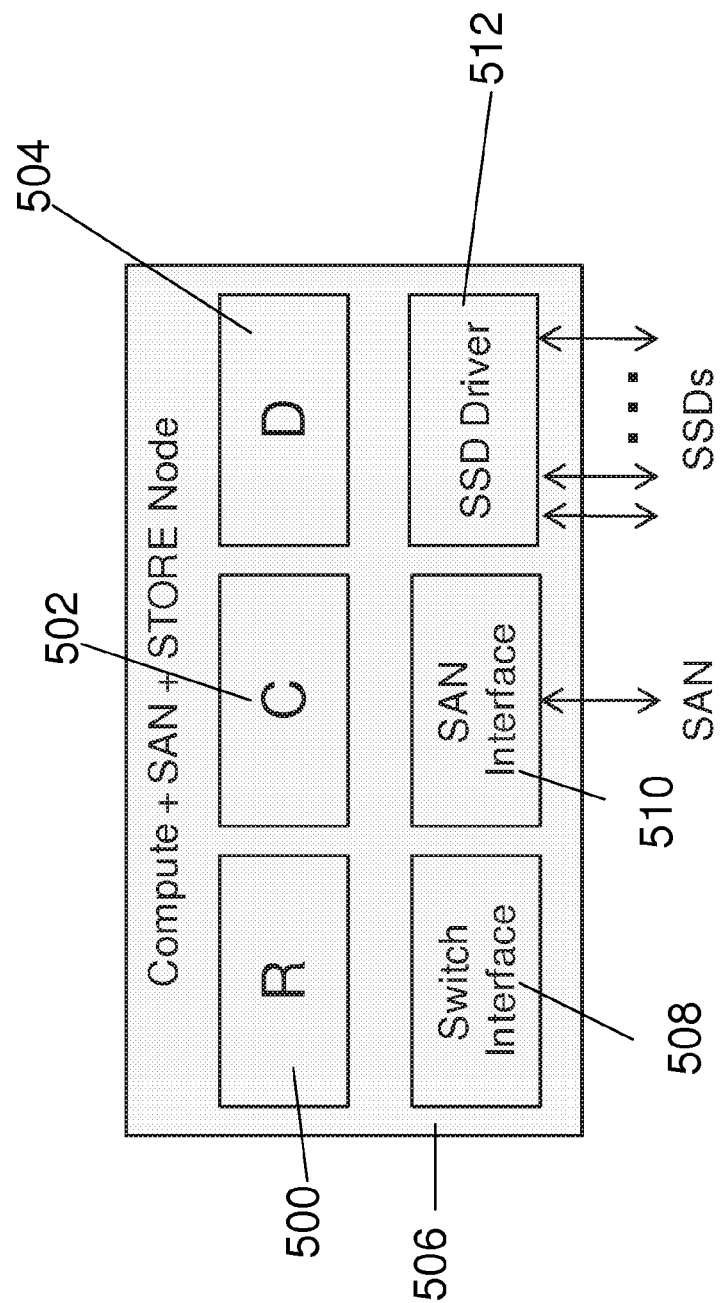
FIG. 5 is a simplified diagram showing a compute+SAN+store node for the device of FIG. 1.

As an example FIG. 5 illustrates a single Node system configuration, in which R, C and D modules, 500, 502 and 504 respectively are together in a compute+SAN+Store node 506. A switch interface 508 links to a switch. A SAN interface 510 provides an interface for storage area networking. An SSD driver 512 interfaces with the storage devices.

A four node system configuration is shown in FIG. 1 above. The configuration includes two compute and store nodes and two compute+SAN nodes.

High Availability

A system that is built from multiple physical Nodes can inherently support a high availability construction, where there is no single point of failure. This means that any Node or sub-Node failure can be compensated for by redundant Nodes, having a complete copy of the system's meta-data, and a complete redundant copy of stored data (or parity information allowing recovery of stored data). The distributed and flexible architecture allows for seamless support of failure conditions by simply directing actions to alternate Nodes.

High Level Module Overview

R Module

Concept

The R module is responsible for:

Routing SCSI I/O requests to the C modules, guarantee execution and return the result.

Balancing the work load between the C modules for the requests it is routing.

Data Structures

A→C table. This table indicates which C module is responsible for each logical X-page address (LXA). Each C module is responsible for a list of Sub LUNs (SLs).

Roles and Responsibilities

The R module receives requests for I/Os from the SAN INTERFACE, routes them to the designated C modules and returns the result to the SAN INTERFACE.

If an I/O operation spans across multiple SLs, and perhaps multiple C modules, then the R module has the responsibility of breaking the big I/O operation into multiple smaller independent operations according to the sub LUN unit size (SLUS). Since the atomic unit size (AUS) is never larger than the SLUS, as explained in greater detail below, each such I/O is treated as an independent operation throughout the system. The results may then be aggregated before returning to the SAN INTERFACE.

The R module is responsible for maintaining an up-to-date A→C table coordinated with the MBE. The A>C table is expected to balance the range of all possible LXAs between the available C modules.

Hash calculations. For write operations, the R module instructs the calculation of the hash digest for each X-Page by requesting such calculation from a Hash calculation module.

C Module

The C module is responsible for:

Receiving an I/O request from an R module on a certain SL, guaranteeing its atomic execution and returning the result.

Communicating with D modules to execute the I/O requests.

Monitoring the disk content of its SLs' logical space by associating each LXA with its hash digest.

Balancing the work load between the D modules for the SLs it is maintaining.

Data Structures

H→D table. This table maps each range of hash digests to the corresponding D module responsible for this range.

A→H table. This table maps each LXA that belongs to the SLs C is responsible for, to the hash digest representing the X-Page Data that currently resides in this address.

Roles and Responsibilities

The C module receives I/O requests from R modules, distributes the work to the D modules, aggregates the results and guarantees an atomic operation. The result is returned to the R module.

The C module maintains an up-to-date H→D table coordinated with the MBE. The table is expected to balance the range of all possible hash digests between the available D modules.

The C module maintains an A→H table in a persistent way. The C module may initiate I/O requests to D modules in order to save table pages to disk, and read them from disk. To avoid frequent disk operations, a Journal of the latest table operations may be maintained.

Data is balanced between the C modules based on the logical address, at the granularity of sub-LUNs.

D Module

The D module is responsible for:

Maintaining a set of LUNs which are attached locally and performing all I/O operations on these LUN.

Managing the physical layout of the attached LUNs.

Managing the mapping between X-Page Data hash digests and their physical location in a persistent way.

Managing deduplication of X-Page Data in a persistent way.

Receiving disk I/O requests from C modules, perform them and returning a result.

For each write operation, backing up the X-Page Data in the designated D backup module. Performing read-modify operations for writes that are smaller than X-Page size. This process also involves computing a hash digest for these X-Pages.

Maintaining an up-to-date H→(D, $D_{backup}$) table coordinated with the MBE. The table is expected to balance the range of all possible hash digests between the available D modules.

The D module does not communicate directly with R modules. The only interaction with R modules involves RDMA read/write operations of X-Page Data.

Balancing between the D modules is based on hashing of the content.

Data Structures

The D module makes use of a hash digest meta data table. The hash digest meta data table maps each in use hash digest, that represents actual X-Page Data, to its meta data information including its physical page on the storage media (SSD), its memory copy (if exists), a mapping to any backup memory copy and a reference count for the purpose of deduplication.

A further structure used is the H→(D, $D_{backup}$) table. This table maps each range of hash digests to the corresponding D module responsible for the range as well as the $D_{backup}$ module responsible for the range.

Roles and Responsibilities

The D modules allocate a physical page for each X-Page.

The D modules manage the memory for the physical storage. They allocate memory pages for read/write operations and perform background destaging from memory to storage media when necessary, for example, when running low on memory.

The D modules manage a separate non volatile memory pool (NVRAM or UPS protected) for X-Page Data backup purposes. The backup holds X-Pages that are held in memory of the D primary and have not yet been destaged. When re-balancing between D modules occurs (due to a D module failure for example), the D module may communicate with other D modules in order to create new backup copies or move a primary ownership as required.

The D modules allow deduplication per X-Page Data by maintaining a persistent reference count that guarantees only one copy per X-Page Data.

The D modules manage the hash digest meta data table in a persistent way. The table is coordinated with the physical layout for physical pages allocation, with the memory pointer, memory backup pointer and deduplication reference count.

The D modules receive I/O requests from C modules, perform the requests while supporting deduplication and return the result. The D modules may perform RDMA read/write operations on memory that resides in other modules, such as R modules as mentioned above, as part of the I/O operation.

When a write operation smaller than the size of an X-Page is received, the D module may read the entire X-Page to memory and perform partial X-Page modification on that memory. In this case race conditions may occur, for example when two small writes to the same X-Page occur in parallel, and the D module may be required to compute the hash digest of the resulting X-Page. This is discussed in greater detail below.

H Module

The H-Module calculates the Hash function of a given block of data, effectively mapping an input value to a unique output value. The Hash function may be based on standards based hash functions such as Sha-1 and MD5, or based on a proprietary function. The hash function is selected to generate a uniformly distributed output over the range of potential input values.

The H modules usually share nodes with an R module but more generally, the H modules can reside in certain nodes, in all nodes, together with R modules, or together with C or D modules.

High Level I/O Flow

The following discussion provides high level I/O flows for read, write and trim.

Throughout these flows, unless noted otherwise, control commands are passed between modules using standard RPC messaging, while data "pull" operations may use RDMA read. Data push (as well as Journal) operations may use RDMA write.

Read

The read flow of one X-Page may consist of one R module which receives the read request from the application, one C module in charge of the address requested and one D module which holds the X-Page to be read. Larger, or unaligned, requests may span several X-Pages and thus may involve several D modules. These requests may also span several SLs, in which case they may involve several C modules as well. We describe these different flows in the following subsections.

Aligned One X-Page

Figure 6:
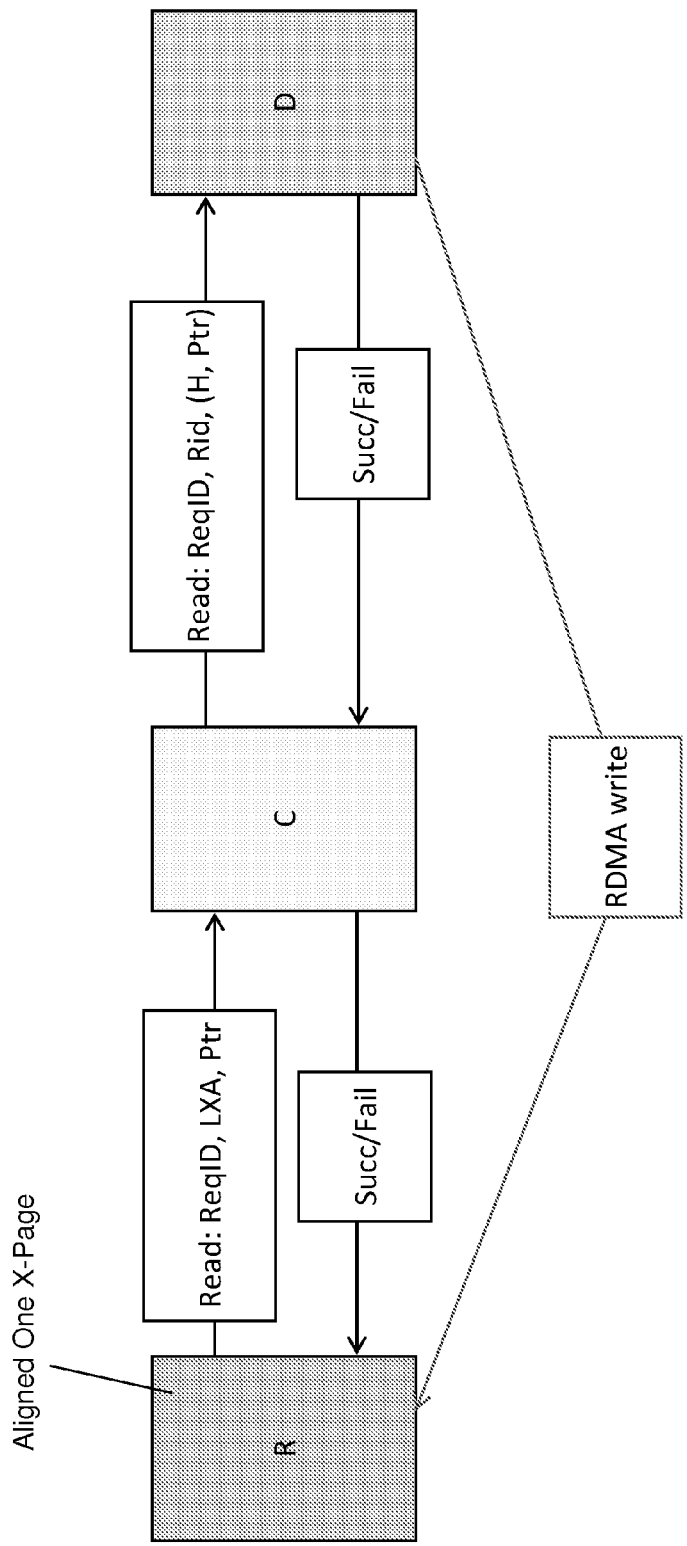
FIG. 6 is a simplified flow chart which illustrates the flow for a read operation for one aligned X-page.

Reference is now made to FIG. 6 which illustrates the flow for a read operation for one aligned X-page.

When the R module receives a read request from an application it performs the following:

Allocates a request ID for the operation.

Translates the LBA to LXA.

Allocates a buffer for the data to be read.

Consults the A→C component to determine which C module is in charge of this LXA.

Sends the designated C module a read request which includes the following parameters:

a request ID;

an LXA; and a pointer to the allocated buffer.

The C module, when receiving the request, performs the following:

Consults the A→H component, from which it obtains a hash digest representing the X-Page to be read.

Consults the H→D component to determine which D module holds the X-Page in question.

Sends this D module a read request which includes the following parameters:

a request ID (as received from the R module);

the hash digest;

a pointer to the buffer to read to, as received from the R module; and an identifier of the R module.

The D module, when receiving the request performs the following:

Reads the data of the requested X-Page from SSD.

Performs an RDMA write to the requesting R module, specifically to the pointer passed to it by the C module.

Finally the D module returns success or error to the requesting C module.

The C module in turn propagates success or error back to the requesting R module, which may then propagate it further to answer the application.

Cross D Modules

Figure 7:
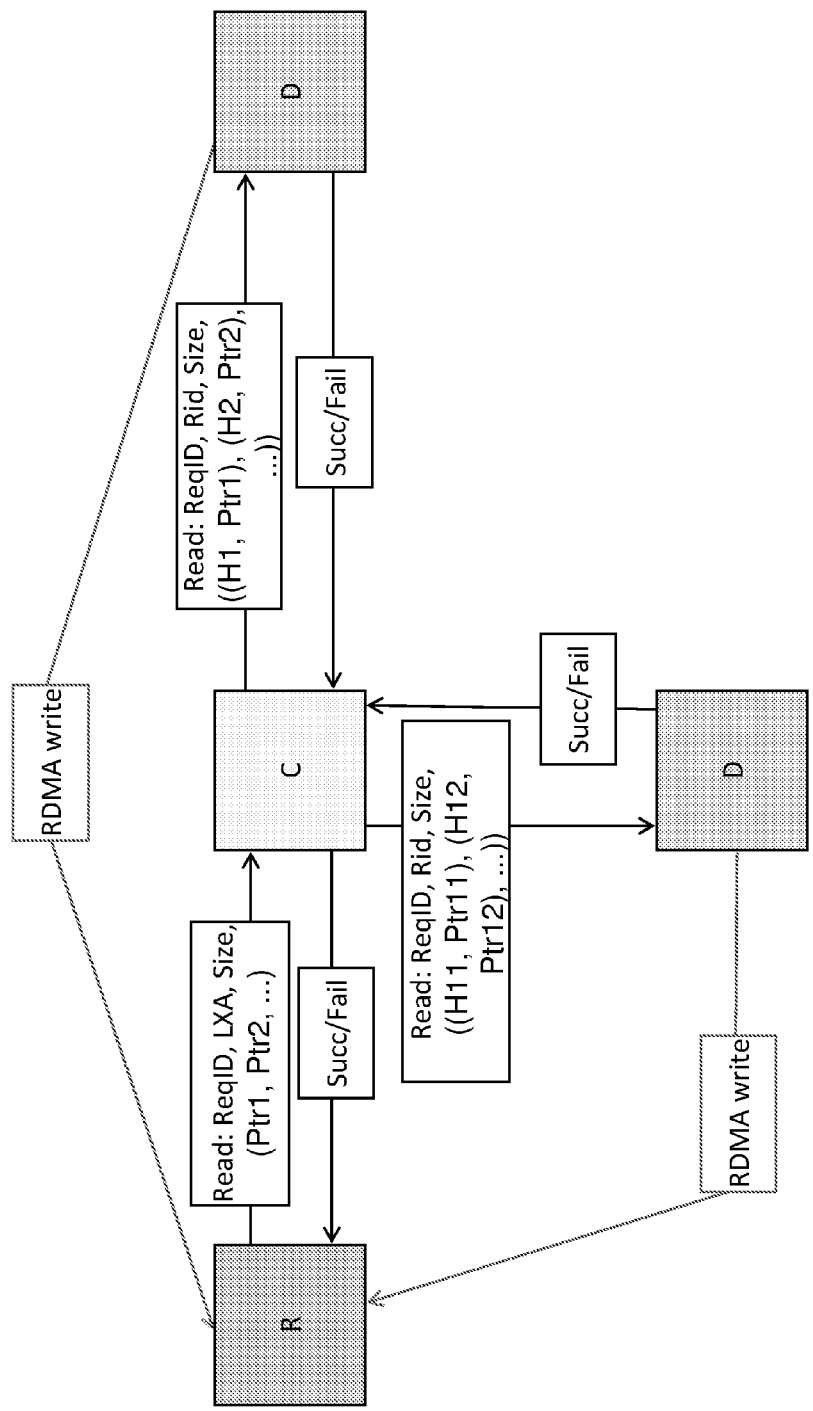
FIG. 7 is a simplified flow chart which illustrates the flow in the event that a read request arrives for a range of addresses spanning more than one X-Page but only one SL according to an embodiment of the present invention.

Reference is now made to FIG. 7, which illustrates the flow in the case that a read request arrives for a range of addresses spanning more than one X-Page but only one SL. In such a case the R module sends the designated C module a read command with the following parameters:

Request ID

First LXA

Size of the requested read in X-Pages–n n pointers to the allocated X-Page buffers The rest of the R module's treatment is identical to the aligned one X-Page scenario described above.

The C module, when receiving the request performs the following:

Divides the logical address space to LXAs.

For each LXA:

Consults the A→H component to determine the corresponding hash digest.

Consults the H→D table to determine which D module is responsible for the current LXA.

Sends each D module a read command containing all the hashes that the respective D module is responsible for. The parameters of the read command are:

request ID (as received from the R module);

a list of respective hash-pointer pairs; and the identifier of the R module

Each D module, when receiving the request, acts per hash-pointer pair in the same manner as described above for one X-Page. Aggregated success or error is then sent to the requesting C module.

The C module aggregates all the results given to it by the D modules and return success or error back to the requesting R module, which may then answer the application.

Cross C Modules

In the case that a read request spans multiple SLs, the R module splits the request and sends several C modules read requests. Each C module may receive one request per SL. The flow may continue as in the simpler case above, except that now the R module must aggregate the responses before it answers the application.

Small and/or Unaligned

Read requests smaller than 4 KB, as well as requests not aligned to 4 KB, may be dealt with at the R module level. For each such parcel of data, the R module may request to read the encompassing X-Page. Upon successful completion of the read command, the R module may crop the non-relevant sections and return only the requested data to the application.

Write

The write flow of one X-Page may consist of one R module which receives the write request from the application, one C module in charge of the address requested and three D modules: $D_{target}$ which is in charge of the X-Page Data to be written (according to its appropriate hash digest), $D_{old}$ which was in charge of the X-Page Data this address contained previously ("old" hash digest), and $D_{backup}$ in charge of storing a backup copy of the X-Page Data to be written.

Aligned One X-Page

Figure 8:
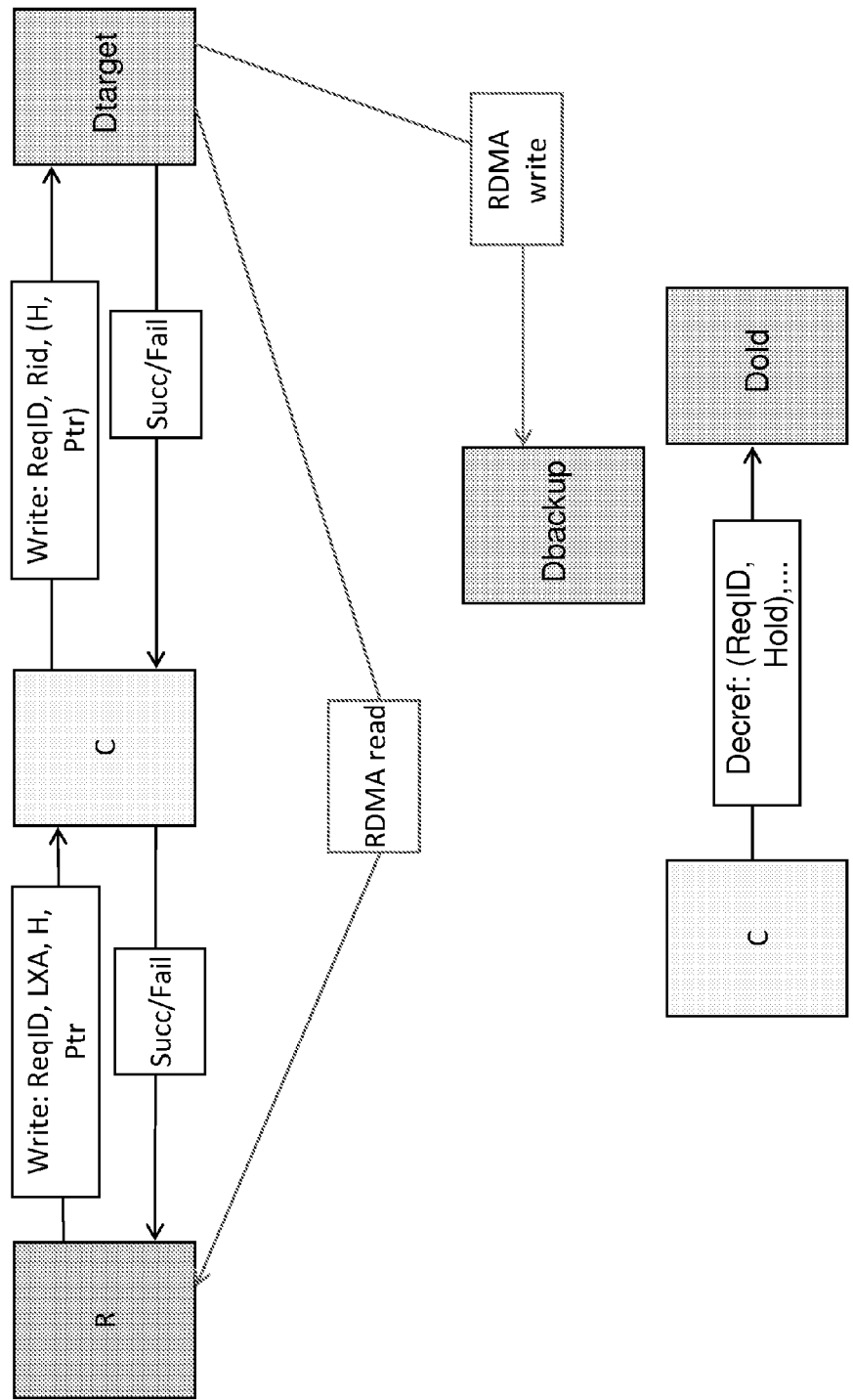
FIG. 8 is a simplified flow diagram illustrating the write procedure for a single aligned X page according to the present embodiments.

Reference is now made to FIG. 8, which is a simplified flow diagram illustrating the write procedure for a single aligned X page according to the present embodiments.

When an R module receives a write request from the application, it performs the following:

The R module allocates a request ID for this operation.

The R module translates the LBA to an LXA.

The R module computes a hash digest on the data to be written.

The R module consults its A→C component to determine which C module is in charge of the current LXA.

The R module sends the designated C module a write command with the following parameters:

a request ID;

an LXA;

a hash digest; and a pointer to the buffer containing the data to be written.

The C module, when receiving the request performs the following:

it consults its H→D component to understand which D module is in charge of the X-Page to be written ($D_{target}$); and it sends $D_{target}$ a write request with the following parameters:

the request ID (as received from the R module);

the hash digest (as received from the R module);

the pointer to the data to write (as received from the R module); and the identifier of the R module.

The D module receiving the write command, $D_{target}$, may first check if it already holds an X-Page corresponding to this hash. There are two options here:

$D_{target}$ does not have the X-Page. In this case it performs the following:

It fetches the data from the R module using RDMA read and stores it in its memory.

It consults the H→D component to determine which D module is in charge of storing a backup copy of this X-Page ($D_{backup}$).

It performs an RDMA write of the X-Page Data to the $D_{backup}$ backup memory space.

It returns success (or failure) to the C module.

$D_{target}$ has the X-Page. In this case $D_{target}$ performs the following:

Increase the reference count.

Return success (or failure) to the C module.

The C module waits for a response from $D_{target}$. If a success is returned, the C module:

The C module updates the A→H table to indicate that the LXA in question should point to the new hash.

The C module returns a response to the requesting R module.

If this is not a new entry in the A→H table, the C module asynchronously sends a decrease reference count command to $D_{old}$ (the D module responsible for the hash digest of the previous X-Page Data). These commands may be aggregated at the C module and sent to the D modules in batches.

The R module may answer the application once it receives a response from the C module.

Multiple X-Pages in Same SL

Figure 9:
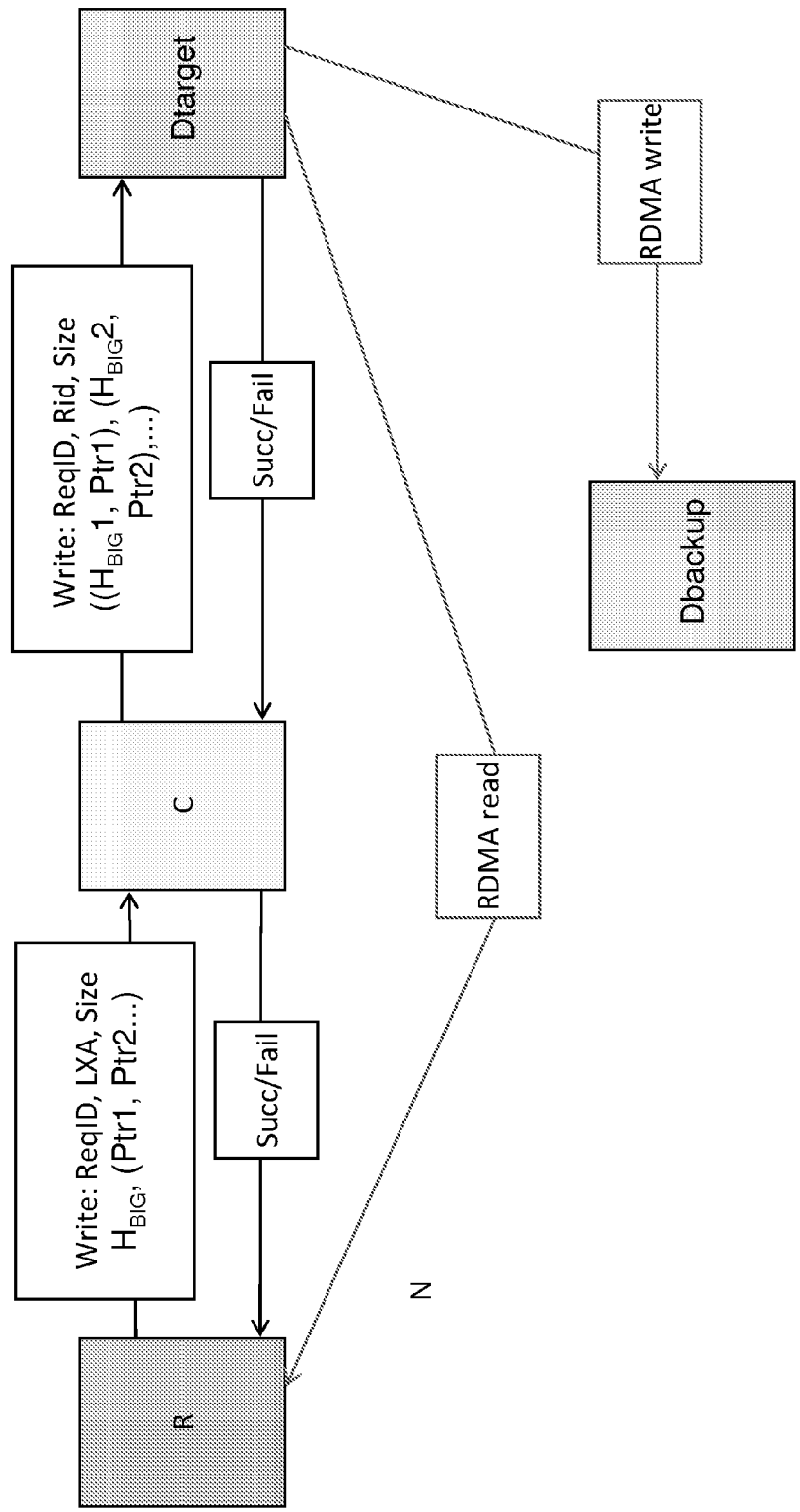
FIG. 9 is a simplified flow diagram illustrating the process for performing write operations to multiple full X-Pages according to the present embodiments.

Reference is now made to FIG. 9, which is a flow diagram illustrating the process for writes to multiple full X-Pages.

In the case that the write request spans a range of addresses which include more than one X-Page but only one SL, the R module sends the designated C module a write command with the following parameters:

a request ID;

a first LXA;

a size of the requested write in LXAs–n; and $H_{BIG}$ which is a unique identifier of the entire chunk of data to be written. $H_{BIG}$ may be a computed hash digest and thus equal for two identical chunks of data.

Additional parameters sent with the write command are n pointers that point to the buffers which hold the data to be written.

The rest of the R module treatment is the same as for the aligned one X-Page scenario.

The C module, when receiving the request performs the following:

It consults its H→D component to understand which D module is in charge of $H_{BIG}$ ($D_{target}$).

It generates a hash digest per pointer by replacing one byte of $H_{BIG}$ with the offset of that pointer. It is noted that this byte must not collide with the bytes used by the H→D table distribution.

It may send $D_{target}$ a write request with the following parameters:

the request ID (as received from the R module);

a list of respective hash-pointer pairs; and the Identifier of the R module.

The D module, when receiving the request, acts per hash-pointer pair in the same manner as described above for one X-Page. Aggregated success or error is then sent to the requesting C module.

The C module waits for a response from $D_{target}$. If the response indicates success, the C module does the following:

The C module updates its A→H table to indicate that the LXAs in question should point to the new hashes. Updating of entries in the A→H table may be done as an atomic operation, to ensure the write request is atomic. Note that all requests aligned to 4 KB (or another predefined block size) that fall within a SL may be atomic. The C module returns a response to the requesting R module.

The C module adds the list of old hashes to the "decrease reference" batch if needed.

The R module answers the application once it receives a response from the C module.

Cross C Modules

In the case in which a write request spans multiple SLs, the R module splits the request and sends smaller write requests to several C modules. Each C module receives one request per SL (with a unique request ID). The flow continues as in the simpler case above, except that now the R module aggregates the responses before it answers the application.

Small and/or Unaligned

Figure 10:
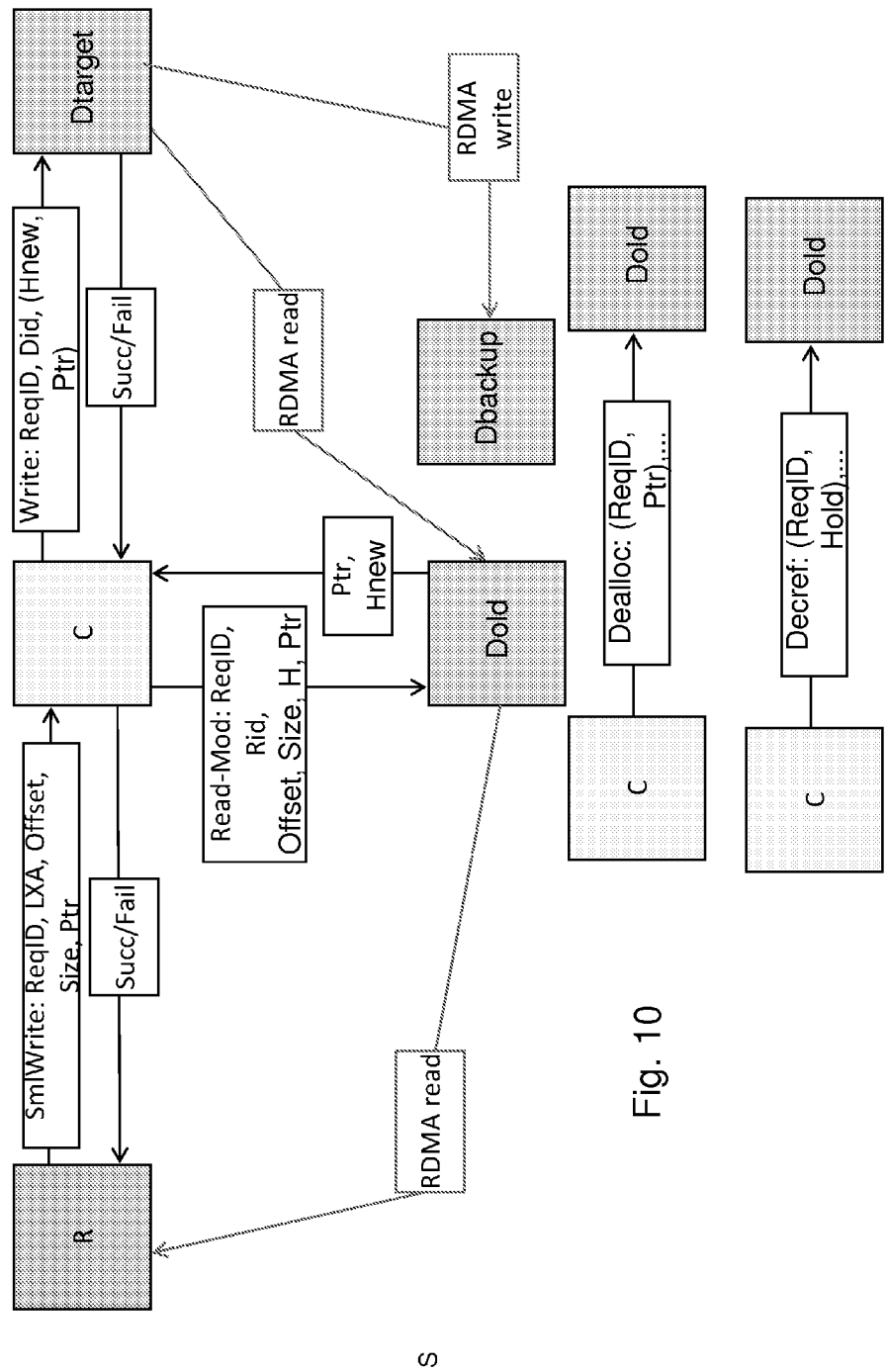
FIG. 10 is a simplified flow diagram illustrating the write process for small or unaligned writes.

Reference is now made to FIG. 10 which is a flow chart illustrating the write process for small or unaligned writes. Small and/or unaligned writes add an extra level of complexity, since the content addressing in fact addresses data according to hash digests of 4 KB (or another predefined block size) X-Pages. The process of writing data which is smaller than the predefined block size, or is not aligned to it, may thus require a read-modify operation followed by a write operation. It may be necessary to read the data of the previous X-Page pointed to by this address (if such a page exists), combine the previous data with the new data to be written, compute a new hash digest on this modified X-Page, and write this newly generated X-Page according to its hash. The process may build upon the regular write process, and may include an extra read-modify flow which may precede the write flow described above.

When the R module receives a small write request from the application, it performs the following:

The R module allocates a request ID for this operation.

The R module finds the LXA of the encompassing X-Page.

The R module consults its A→C component to determine which C module is in charge of the identified LXA.

The R module places the small data to be written in a zeroed out X-Page buffer according to its offset and size.

The R module sends the designated C module a write command with the following parameters:

the request ID;

the LXA;

the offset and size (in LBs) information indicating which part of the X-Page should be written; and a pointer to the buffer containing the encompassing X-Page of the data to be written.

The C module consults its A→H component to determine if an X-Page exists for the current LXA.

If an A→H entry exists for the current LXA the C module sends data module $D_{old}$ a read-modify request with the following parameters:

a request ID (as received from the R module);

a hash digest of the previous X-Page Data this address was mapped to;

the offset and size (in LBs) information indicating which part of the X-Page should be modified;

a pointer to the buffer containing the encompassing X-Page of the data to be written; and the identifier of the R module holding the data.

The $D_{old}$ data module responds with:

a pointer to the modified X-Page; and the computed hash of the modified X-Page.

The C module now sends a standard write command to the appropriate $D_{target}$, according to the computed hash it receives. The command includes the following parameters:

a request ID (as received from the R module);

a hash digest (as received from the $D_{old}$ module);

a pointer to the data to write (as received from the $D_{old}$ module); and an identifier for the $D_{old}$ module.

After $D_{target}$ returns to the C module, the C module does the following:

The C module updates the A→H table to indicate that the LXA in question should point to the new hash.

The C module sends $D_{old}$ a decrement reference count command on the old hash digest before the modification, and a "deallocate buffer" command with the pointer, which indicates it may free the temporary buffer holding the modified X-Page. These commands may be aggregated and sent in batches.

If an A→H entry does not exist for the current LXA, the C module may consider the requesting R module as a substitute $D_{old}$.

In the case of there not being an entry, the C module sends the R module a "compute hash" request, with a pointer to the buffer containing the X-page of the data to be written.

The R module may then compute the hash on the buffer and return it to the C module.

The C module now continues as per the aligned operation, sending a write command to the appropriate $D_{target}$, according to the hash received from the R module, updating the A→H table, etc.

As in a regular write operation, the R module waits for a response from the C module, and then returns the response to the application once it is received.

In the following we describe the flow of $D_{old}$ when it receives a read-modify request:

The module reads the data of the requested X-Page from SSD.

An RDMA read is carried out of the small data buffer from the R module, using the pointer passed to it by the C module and the known offset and size.

The D module writes the small data buffer content on top of the X-Page according to the offset and size parameters passed to it by the C module.

The D module computes the hash of the new modified X-Page and returns the hash and pointer to the C module.

Parallel Overlapping I/Os

In case of parallel small writes to the same LXA, there is a possibility that one will accidentally undo the other. This problem can be solved in one of two ways:

Option 1: The C module may lock an LXA which has a small write in progress.

Option 2: When the C module is ready to complete the write operation by updating its A→H table, after receiving success from $D_{target}$, it can test if the old hash sent to $D_{old}$ equals the one currently in the A→H table. If not, it may do the following:

Send $D_{old}$ a deallocate buffer command to indicate it may free the temporary buffer holding the modified X-Page. Please note that decrement reference count is not required in this case, since it is performed by the parallel write.

Send $D_{target}$ a decrease reference command for the new hash digest computed by $D_{old}$.

Repeat the read-modify operation according to the hash currently in the A→H table, which may for example point to another $D_{old}$.

Small Writes Optimization

Approach

In some applications, sequential small writes are common. The present embodiments impose some potentially costly extra steps in these cases, so, in the case of repetitive small writes to the same X-Page, the following optimization may be used.

The basic approach behind this optimization is to have $D_{old}$ take the ownership of the X-Page by aggregating consecutive small writes to the same X-Page and responding to read requests for this address. Such a procedure provides three advantages:

Avoid the processing of $D_{target}$ for every small write.

Avoid a possible read (unless X-Page is already in memory) on every small write since one read may be performed on the first small write, but the following small writes may be executed on the buffer $D_{old}$ holds in memory.

Avoid a hash computation for every small write.

In a sense, it means that the X-Page handling for this particular page becomes address based and not hash based and $D_{old}$ is taking over a buffer that according to the true hash digest does not belong to it. Only this D module is aware of the deception but it makes sure the respective C module cooperates.

The idea behind the implementation is that $D_{old}$ assigns the X-Page an artificial hash digest and updates the C module's A→H table so the LXA points to this artificial hash digest. Subsequent small writes may simply be written to the temporary buffer in $D_{old}$. It should be noted that the buffer may be backed up whenever it changes, and that this optimization does not allow for deduplication since we have omitted the hash computation. At some point in the future, $D_{old}$ may initiate a procedure that writes this X-Page properly to another $D_{target}$ according to its computed hash digest.

The small write optimization thus maximizes performance for small block operations—that is operations that are smaller than the basic common block size (4 KB in the example) by aggregating such operations and minimizing the overhead of handling small block reads/writes. The common way of addressing small block operations is through a "read-modify-write" operation, but this is costly and far from optimal when there is locality, for example sequential locality, of the small write/read operations. The present approach takes advantage of the locality and avoids the read-modify-write penalty and overhead.

Flow

We start with the C module receiving the small write command. It performs the following:

It consults its A→H component to determine if an X-Page exists for the current LXA.

If an A→H entry exists for the current LXA, the C module sends $D_{old}$ a read-modify request with the following parameters:

a request ID (as received from the R module);

a hash digest;

an offset and size information in LBs indicating which part of the 4 KB X-Page is to be modified;

a pointer to the buffer containing the encompassing X-Page;

an identifier of the R module holding the data;

the C module write context, that is the LXA value, to embed in the artificial hash digest and send to C as a parameter for any future write command of the current X-Page when initiated by $D_{old}$ as discussed in further detail below.

$D_{old}$ may respond with an artificial hash digest for the modified X-Page. The hash encoding may include the request ID, C module ID and C write context (LXA). Additionally, the hash may be specifically generated to fall into a hash range under the responsibility of the present D module.

When $D_{old}$ returns, the C module may do the following:

The C module may update the A→H table to indicate that the LXA in question should point to the artificial hash digest.

The C module may send a decrement reference command to the D module on the old hash digest before the modification.

For the edge case where an A→H entry does not exist for the current LXA, the present embodiments do not perform any optimization and continue in the regular flow, namely the C module requests assistance from the R module. Since this happens only when an LXA is accessed for the first time ever, this does not result in loss of performance on the average case.

Now we describe the flow of $D_{old}$ when it receives a read-modify request:

The $D_{old}$ data module reads the data of the requested X-Page from the SSD

The module performs an RDMA read of the small data from the R module buffer, using the pointer passed to it by the C module as well as offset and size information.

The module writes the small data buffer content on top of the X-Page according to the offset and size parameters passed to it by the C module.

The module performs an RDMA write of the modified X-Page to the designated $D_{backup}$.

The module may create an artificial hash digest for the modified X-Page that falls in a hash range $D_{old}$ is responsible for and encodes the following fields:

request ID—to ensure the artificial hash digest is unique across different write operations;

C module ID—for the D module to remember the C module responsible for the address. This C module may thus be the target for a future write operation initiated from this D module; and C write context (LXA)—to be passed to C module at write command on this X-Page.

The hash digest may then be returned to the C module.

When $D_{old}$ receives the decrement reference count request for the old hash digest it may act accordingly.

Overlapping Writes

Now we check what happens in the parallel overlapping writes use case. We can use the same solutions that were suggested above, but we must make sure that the artificial hash digests are unique per write operation. To ensure that we encode the request ID inside the artificial digest.

Note that the C module knows which D module to send the deallocate buffer command, since the artificial hash digest is associated with that D module.

Read Support

We now consider what happens in case a read request comes for the presently defined address.

The C module, when receiving the read request performs the following:

It consults its A→H component to determine the artificial hash digest.

It consults its H→D component to determine the appropriate D module.

It sends the D module a read request which includes the following parameters:

a request ID (as received from the R module);
a hash digest (artificial);
a pointer that was passed to it by the R module; and
an identifier of the R module.

The D module, when receiving the request performs the following:

It may find the data of the requested X-Page.

It may perform an RDMA write to the requesting R module (to the pointer passed to it by the C module).

It may return success or error to the requesting C module.

Please note that this read flow is exactly the same as a standard one X-Page read flow, there is no special behavior for this use case.

Full X-Page Write

After a while, $D_{old}$ decides to initiate a standard write procedure for the current X-Page to bring this X-Page back to normal. First, we consider when this happens or more precisely what are the conditions for this to happen. The present embodiments use some or all of the following criteria:

$D_{old}$ is short on free buffers in memory.

A certain amount of data has been written to the X-Page buffer. For example the total number of bytes in all small writes may have accumulated to the size of the X-Page. Such a condition covers the trivial case where a full write to the X-Page has been performed.

A certain amount of time has passed (timeout).

A re-balancing act has caused the present hash to be passed to another D module's responsibility. The accepting D module may then bring the X-Page back to normal.

Use of the above criteria may be left to the low level design, and to the discretion of the skilled person.

Now, we describe how the write operation may be performed. $D_{old}$ decodes the C module ID from the artificial hash digest. It then sends the C module a write request that is identical to a standard write request as sent from an R module. For this command $D_{old}$ may compute the hash digest of the modified X-Page. The command contains the following parameters:

request ID (not the one from the hash digest, a new one allocated by the D module);

C write context—LXA (as decoded in the artificial hash digest);

the hash digest (actual one computed on the modified X-Page); and a pointer to the 4 KB buffer containing the data to be written.

From this point on, the write operation flow is exactly the same as a standard write flow of one aligned X-Page, except that the R module is replaced by $D_{old}$ which receives the result of this write. If the write is successful, $D_{old}$ can remove the artificial hash digest and its associated resources, including the memory buffer containing the data.

Trim

Figure 11:
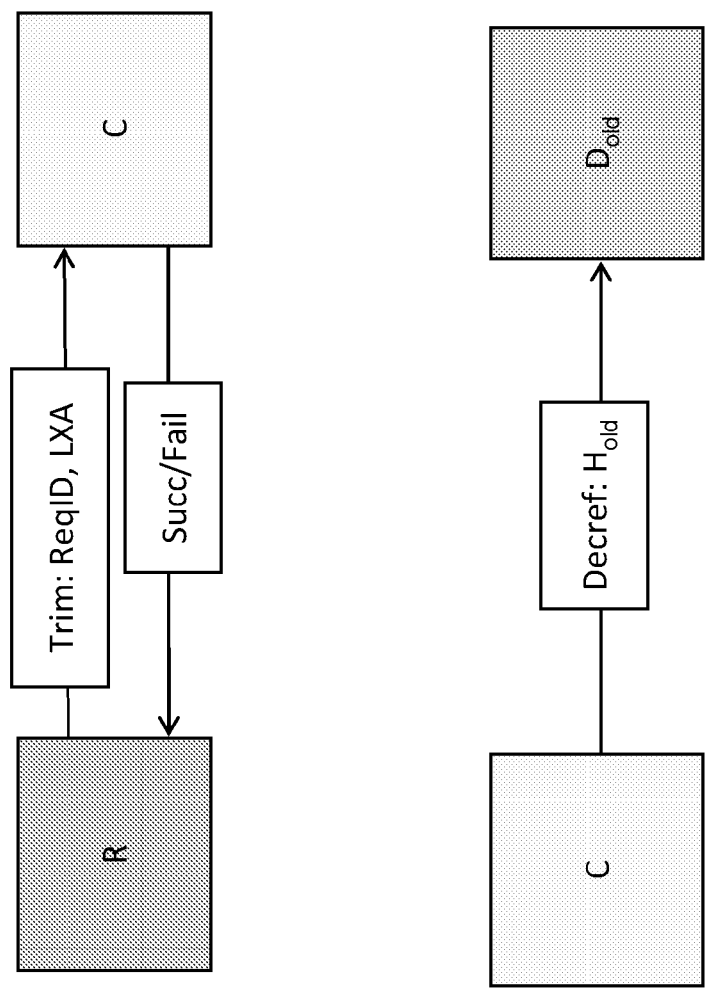
FIG. 11 is a simplified flow diagram illustrating the trim, or erase, process according to the present embodiments.

Reference is now made to FIG. 11, which is a simplified schematic flow diagram showing the trim process in accordance with the present embodiments. Trim is an input output modifier, which may modify the data in accordance with the requirements of an application. The trim flow of one X-Page may utilize one R module which receives the trim request from the application and one C module in charge of the address requested. D modules are not involved in this process. Larger (or unaligned) requests may span several SLs and thus may involve several C modules. We will describe these different flows in the following subsections.

It is assumed that the proper handling of a read to a previously trimmed address returns all zeros. If this assumption can be softened to allow returning arbitrary data, several of these flows may be simplified.

Aligned One X-Page

When the R module receives a trim request from the application it performs the following:

It may allocate a request ID for this operation.

It may translate LBA to LXA.

The R module may consult its A→C component to identify the C module in charge of the present LXA.

The R module then sends the designated C module a trim command which includes the following parameters:

Request ID; and
LXA.

The C module, when receiving the request performs the following:

It may update the A→H table to indicate that the LXA in question should be removed.

It may return a response to the requesting R module.

If this entry was previously present in the A→H table, the C module may send asynchronously a "decrease reference" command to $D_{old}$, the D module holding the hash previously pointed to by LXA. These commands may be aggregated at the C module and sent to the D module in batches.

The C module may respond with success or error back to the requesting R module, which may propagate it further to answer the application.

Multiple X-Pages on Same SL

In the event that a trim request spans multiple LXAs in the same SL, the R module may send one request to the designated C module with the following parameters:

Request ID;

first LXA; and size of the requested trim in LXAs;

The C module may then treat each LXA in the range as described for one X-Page.

Cross C Modules

In the event that a trim request spans multiple SLs, the R module may split the request and send several C modules trim requests. Each C module may receive one request per SL, with a unique Request ID. The flow may continue as in the simpler case above, except that now the R module must aggregate the responses before it answers the application.

Small and/or Unaligned

Trim requests smaller than 4 KB, as well as requests not aligned to 4 KB, may be considered as a small write of all zeros.

Advanced Storage Functionality

In-Line Deduplication

As outlined above, and specifically in the Write flow description, all data blocks are mapped to D-Modules and stored based on the Hash function value of the block content. This means that data blocks of identical content are mapped to the same physical location. The A→H mapping in the C-Module, that maps user addresses to hash values and the hash based physical mapping in the D-Modules, keep track of all mapping necessary to read a block based on its user address.

The result of the mapping mechanism is that identical blocks are only stored once, physically. Multiple user addresses having the same value inherently point to the same hash value in the A→H mapping, which in turn maps to the same physical location on the storage media (SSD) through the D-Module hash-based physical mapping. This deduplication effect is achieved in-line, while writing data to the system, and requires no additional specialized deduplication process to be executed.

General

The presently described architecture is optimized and designed for any storage media that provides effective Random Access reads and writes. This is true for RAM, SSD, and in particular, flash memory based SSDs. RAM and Flash technologies are the most relevant today, but other memory technologies may nevertheless be considered by the skilled person.

In a solution that is distributed, the transfer of data and control information is carried out through a network that interconnects the Nodes comprising the system. Inherently to a scalable solution that may scale to include a large number of Nodes, and maintain balancing of computational and storage tasks between the Nodes, data and control information need to be sent between the Nodes. The time or latency of sending such large amounts of data between Nodes has a significant impact on the overall performance of the system.

Different networking schemes and protocols can be used in such a system, all enabling the transfer of data between Nodes, but the particular scheme or protocol used may be selected for low latency. A scheme that may be considered for low latency is one that enables the use of a Remote Direct Memory Access (RDMA) protocol for the transfer of data between Nodes. Such an RDMA protocol allows one destination Node to directly access the memory space of a source Node, and copy the data to be transferred directly from the source Node's memory to the destination Node's memory without requiring any intervention from higher layers of processing or computing. This allow a relatively fast transfer of data between Nodes, minimizing delays due to creation of multiple copies of the transferred data and the processing of such copies along the way, since transfer is done directly between the source and destination memories.

Therefore, the specific use of an RDMA-enabled network for interconnecting the Nodes in the distributed, scalable storage solution, provides improved performance with low latency, even as the system scales to large number of interconnected Nodes.

It is appreciated that certain features of the invention, which are, for clarity, described in the context of separate embodiments, may also be provided in combination in one or more combination embodiments. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A device for scalable block data storage and retrieval using content addressing, said content addressing comprising using said content to define an address in which to place said content, the device comprising data storage devices operative to store said blocks, the data storage devices being connected over a network to computing modules, the computing modules comprising at least one of control modules, at least one of routing modules, and at least one of data modules, the modules being configured to carry out said content addressing to define locations in said storage and retrieval, said network defining separately control paths via said at least one of control modules, data paths via said at least one of data modules and distributing workload over the at least one of control modules and the at least one of data modules by the at least one of routing modules, such that data to be routed over said separate data paths is routed based on content thereof;

wherein said at least one of data modules are operative to compare hash values of write data with hash values of stored data, and when a match is found, to point to the matched data and avoid rewriting;

wherein when the hash values of write data do not match hash values of already stored data, said at least one of data modules are operative to write the write data and store the hash values of the write data;

wherein said at least one control modules are enabled to align an unaligned write of write data to said at least one of data modules; and wherein each routing module is enabled to route data over multiple data paths, wherein each data path is through a control module, wherein the data path is routed based on an associated logical address.

2. The device of claim 1, wherein said storage devices are random access storage devices.

3. The device of claim 1, wherein said modules are combined into nodes on said network, and said nodes are connected over said network by a switch, said network comprising a remote direct memory access network.

4. The device of claim 1, wherein said data storage is carried out with a granularity of 4 KB.

5. The device of claim 1, wherein said at least one of control modules are operative to use said content addressing to ensure that identical data appearing a second time is supplied with a pointer and not written, thereby avoiding duplicate write operations.

6. The device of claim 1, wherein said at least one of control modules are operative to control execution of read and write commands and said at least one of data modules are respectively connected to at least one of said storage devices and are operative, under control of a respective control module, to pass data to or from said at least one respectively connected storage devices and to retain extracts of data stored in said at least one respectively connected storage device, said extracts being for said content addressing.

7. The device of claim 6, further comprising hash modules, said hash modules being operative to calculate hash values for data which is the subject of storage or retrieval commands, the hash value being usable to provide said extracts for said content addressing.

8. The device of claim 7, wherein said hash modules are configured to use a hash function having an output range which is mapped evenly over said storage devices.

9. The device of claim 1, further comprising routing modules, said routing modules being operative to terminate storage and retrieval operations and to distribute command parts of said operations to ones of said at least one of control modules selected to retain balanced usage within said device.

10. The device of claim 9, wherein said routing modules comprise hash calculation units operative to calculate hash values for data of said operations.

11. The device of claim 9, wherein said routing modules are operative to incorporate said hash values into digests which are associated with pages of said data.

12. The device of claim 9, wherein said routing modules are operative to use hash values of data associated with said operations to select one of said data modules for said distribution.

13. A method for scalable block data storage and retrieval using content addressing, said content addressing comprising using said content to define an address in which to place said content, the method comprising connecting data storage devices, to store said blocks, over a network to computing modules, the modules comprising control modules, routing modules and data modules, the modules carrying out content addressing to define locations of said storage and retrieval, defining separately control paths via said control modules and data paths via said data modules and distributing workload over the at least one of control modules and the at least one of data modules by the at least one of routing modules, data travelling over said data paths being routed according to content thereof;

wherein said data modules compare hash values of write data with hash values of stored data, and when a match is found, point to the matched data and avoid rewriting;

wherein when the hash values of write data do not match hash values of already stored data, said at least one of data modules are operative to write the write data and store the hash values of the write data;

wherein said at least one control modules are enabled to align an unaligned write of write data to said at least one of data modules; and wherein each routing module is enabled to route data over multiple data paths, wherein each data path is through a control module, wherein the data path is routed based on an associated logical address.

14. The method of claim 13, wherein said storage devices are random access storage devices.

15. The method of claim 13, comprising combining said modules into nodes on said network, and connecting said nodes over said network by a switch, said network comprising a remote direct memory access network.

16. The method of claim 13, wherein said control modules control execution of read and write commands and said data modules are respectively connected to at least one of said storage devices and, under control of a respective control module, pass data to or from said at least one respectively connected storage devices and retain extracts of data stored in said at least one respectively connected storage device, said extracts being for said content addressing.

17. The method of claim 16, further comprising connecting hash modules to said network, and at said hash modules calculating hash values for data which is the subject of storage or retrieval commands, the hash value providing said extracts for said content addressing.

18. The method of claim 13, further comprising connecting routing modules to said network, and at said routing modules terminating storage and retrieval operations and distributing command parts of said operations to ones of said control modules selected to retain balanced usage within said device.

19. The method of claim 18, comprising calculating, at said routing module, hash values for data being the subject of said operations.

20. The method of claim 18, wherein said routing modules use hash values of data associated with said operations to select one of said data modules for said distribution.

21. A method of expandable content addressable data storage comprising:

hashing incoming data into hash digests using a hashing function having an output space, to provide content addressing by which to store said incoming data into memory;

initially providing a plurality of modules including control modules, routing modules and data storage modules for physical management of said data, said physical data management comprising mapping said hash function output space evenly over said data storage modules;

maintaining said hashed incoming data as a single content addressable storage pool for virtual management of said data; thereby to provide a structure for content addressable memory which is physically expandable without affecting the virtual management of the data;

wherein said data storage modules compare hash values of write data with hash values of stored data, and when a match is found, point to the matched data and avoid rewriting;

wherein when the hash values of write data do not match hash values of already stored data, said at least one of data storage modules are operative to write the write data and store the hash values of the write data;

wherein said at least one control modules are enabled to align an unaligned write of write data to said at least one of data modules;

wherein each routing module is enabled to route data over multiple data paths, wherein each data path is through a control module, wherein the data path is routed based on an associated logical address;

distributing a workload, using the routing modules, over the control modules and the data modules.

22. An expandable content addressable data storage system comprising:

hashing modules configured to hash incoming data into hash digests using a hashing function having an output space, to provide content addressing by which to store said incoming data into content-addressable memory;

control modules, routing modules and data storage modules for physical management of said data, said physical data management comprising mapping said hash function output space evenly over said data storage modules;

said hashing, control and switching modules being configured together to manage said hashed incoming data virtually as a single content addressable storage pool; thereby to provide a structure for content addressable memory which is physically expandable without affecting the virtual management of the data;

wherein said data storage modules compare hash values of write data with hash values of stored data, and when a match is found, point to the matched data and avoid rewriting;

wherein when the hash values of write data do not match hash values of already stored data, said at least one of data storage modules are operative to write the write data and store the hash values of the write data;

wherein said at least one control modules are enabled to align an unaligned write of write data to said at least one of data modules;

wherein said routing modules distributes a distributing a workload over the control modules and the data modules;

wherein each routing module is enabled to route data over multiple data paths, wherein each data path is through a control module, wherein the data path is routed based on an associated logical address.

* * * * *